United States Patent
Rabipour et al.

(10) Patent No.: US 9,420,114 B2
(45) Date of Patent: Aug. 16, 2016

(54) ECHO CANCELLER FOR VOIP NETWORKS

(71) Applicant: TELEFONAKTIEBOLAGET L M ERICSSON (PUBL), Stockholm (SE)

(72) Inventors: Rafi Rabipour, Quebec (CA); Dominic Ho, Columbia, MO (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 207 days.

(21) Appl. No.: 13/959,991

(22) Filed: Aug. 6, 2013

(65) Prior Publication Data

US 2015/0043571 A1    Feb. 12, 2015

(51) Int. Cl.
*H04M 9/08* (2006.01)
*H04B 3/23* (2006.01)

(52) U.S. Cl.
CPC ............... *H04M 9/082* (2013.01); *H04B 3/235* (2013.01)

(58) Field of Classification Search
None
See application file for complete search history.

(56) References Cited

U.S. PATENT DOCUMENTS

| | | | | |
|---|---|---|---|---|
| 6,324,170 B1 * | 11/2001 | McClennon et al. | ......... | 370/286 |
| 6,757,384 B1 * | 6/2004 | Ketchum | ............... | H04M 9/082 379/406.01 |
| 6,816,592 B1 * | 11/2004 | Kirla | ......................... | H04B 3/23 370/289 |
| 7,039,182 B1 * | 5/2006 | Leonidov | ............... | H04M 9/082 379/406.03 |
| 7,304,962 B1 * | 12/2007 | Kirla | ......................... | H04B 3/23 370/289 |
| 7,333,447 B2 * | 2/2008 | LeBlanc | ............... | H04M 9/082 370/286 |
| 8,238,548 B2 | 8/2012 | Frauenthal et al. | | |
| 2001/0028634 A1 | 10/2001 | Huang et al. | | |
| 2003/0035384 A1 * | 2/2003 | Cline et al. | ...................... | 370/286 |
| 2003/0053618 A1 * | 3/2003 | Marchok et al. | ......... | 379/406.01 |
| 2003/0091182 A1 * | 5/2003 | Marchok | ................. | G10L 15/30 379/392.01 |
| 2003/0219113 A1 | 11/2003 | Bershad et al. | | |
| 2003/0223574 A1 * | 12/2003 | Schulz | ................... | H04M 9/082 379/406.01 |
| 2004/0081315 A1 | 4/2004 | Boland et al. | | |
| 2004/0120510 A1 | 6/2004 | LeBlanc | | |
| 2004/0184443 A1 | 9/2004 | Lee et al. | | |
| 2006/0098807 A1 * | 5/2006 | Page et al. | ................. | 379/406.01 |
| 2006/0140392 A1 * | 6/2006 | Ahmadi | .................... | H04B 3/23 379/406.1 |
| 2008/0075269 A1 * | 3/2008 | Raifel | ....................... | H04B 3/23 379/406.01 |
| 2008/0080702 A1 * | 4/2008 | Zhang | ....................... | H04B 3/23 379/406.08 |
| 2008/0205633 A1 * | 8/2008 | Dyba | ...................... | H04M 3/002 379/406.08 |
| 2008/0212567 A1 * | 9/2008 | El-Hennawey et al. | ...... | 370/352 |
| 2008/0317241 A1 * | 12/2008 | Wang et al. | ............... | 379/406.11 |

(Continued)

FOREIGN PATENT DOCUMENTS

WO    WO 2014004790 A1 *  1/2014   ............ H04M 9/082

*Primary Examiner* — Chi H Pham
*Assistant Examiner* — Vladislav Agureyev
(74) *Attorney, Agent, or Firm* — Coats & Bennett, PLLC (57) ABSTRACT

An echo canceller for an IP network includes an adaptive filter that models the echo path and generates an estimate of the echo signal from a receiving input signal. The echo canceller subtracts the estimate of the echo signal from a sending input signal to generate a sending output signal with reduced echo. Variation in the echo delay is detected. A delay circuit compensates for the changes in the echo delay to provide proper time-alignment between the estimate of the echo signal and the sending input signal so that the echo signal will be more effectively cancelled.

25 Claims, 11 Drawing Sheets

(56) References Cited

U.S. PATENT DOCUMENTS

| | | | |
|---|---|---|---|
| 2009/0168673 A1* | 7/2009 | Kalampoukas | H04M 9/082 370/286 |
| 2009/0202063 A1* | 8/2009 | Frauenthal et al. | 379/406.16 |
| 2010/0054454 A1* | 3/2010 | Cao | H04B 3/23 379/406.08 |
| 2010/0191525 A1 | 7/2010 | Rabenko et al. | |
| 2011/0149815 A1* | 6/2011 | James | H04M 9/082 370/286 |
| 2011/0205915 A1* | 8/2011 | Skrabutenas et al. | 370/252 |
| 2012/0287769 A1* | 11/2012 | Saleem | H04M 9/082 370/201 |
| 2014/0112467 A1* | 4/2014 | Wyss | H04B 3/23 379/406.08 |
| 2014/0358526 A1 | 12/2014 | Abdelal et al. | |

\* cited by examiner

ECHO CANCELLER FOR VOIP NETWORKS

TECHNICAL FIELD

The present disclosure relates generally to echo cancellation for voice communications and, more particularly, to an echo canceller for deployment in an IP network subject to packet loss, jitter, and other impairments that cause non-linearities in the echo path.

BACKGROUND

Traditional telephony was based on circuit-switched (CS) networks, which still remain the predominant means for carrying voice communication. Landline circuit-switched connections typically give rise to echo due to the imperfect balance of hybrid circuits at the junction of the 4-wire network and the 2-wire local loop. Echo is recognized as a severe voice quality impairment, and echo cancellers are typically deployed within the circuit-switched network to resolve the problem.

With the emergence and the accelerated adoption of Internet Protocol (IP) networks, it is increasingly common for voice communication paths to span a mix of IP and circuit-switched networks. Such a voice path, when terminating on a landline endpoint, will suffer degradation due to echo, requiring echo cancellation. The conventional (and typically the best) location for the echo canceller is in the circuit-switched network, near the source of the echo. However, under certain circumstances it may not be feasible to rely on deployment of echo cancellers in the circuit-switched network. For example, the network operator in charge of the IP network (or of a wireless network) may not have control over the type (and effectiveness) of echo cancellers deployed in the CS network, making it desirable or necessary to treat the echo by deploying an echo canceller in the IP network.

IP networks are subject to impairments such as packet loss and delay variation (jitter). To an echo canceller deployed in the IP network, the portion of the network between the echo canceller and the echo source is a part of the echo-path. Packet loss, jitter, as well as their remedies, i.e. packet-loss concealment (PLC) and jitter buffer delay variation (JBDV), cause nonlinear behavior of the echo-path that are extremely harmful to the operation of conventional echo cancellers designed to adapt to echo-paths with linear impulse responses.

Furthermore, PLC an d JBDV can occur both in the send direction (IP-to-CS path) and the receive direction (CS-to-IP path). When PLC and/or JBDV occur in the send direction, the node including the echo canceller will not have explicit knowledge of the packet loss or JBDV experienced in that path.

SUMMARY

The present disclosure relates to an echo canceller for an IP network including an adaptive filter that models the echo path and generates an estimate of the echo signal from a receiving input signal. The echo canceller subtracts the estimate of the echo signal from a sending input signal to generate a sending output signal with reduced echo. Variation in the echo delay is detected. A delay circuit compensates for the changes in the echo delay to provide proper time-alignment between the estimate of the echo signal and the sending input signal so that the echo signal will be more effectively cancelled.

Exemplary embodiments of the disclosure comprise methods implemented by an echo canceller in an IP network. In one exemplary method, the echo canceller generates, from a receiving input signal received on a first input port of an echo canceller, a first estimate of an echo signal using an adaptive filter that models an echo path between a first output port and a second input port of the echo canceller. The echo canceller computes a first estimate of the echo delay by correlating the first estimate of the echo signal with a sending input signal received on said second input port, and time-aligns the first estimate of the echo signal with the sending input signal based on the first estimate of the echo delay. Following time-alignment, the first estimate of the echo signal is subtracted from the sending input signal to generate a sending output signal with reduced echo for output over a second output port of the echo canceller.

Other embodiments of the disclosure comprise an echo canceller in an IP network. The echo canceller comprises a filter circuit, a delay circuit, a delay estimation circuit, and an echo cancellation circuit. The filter circuit comprises an adaptive filter circuit configured to generate, from a receiving input signal received on a first input port of the echo canceller, a first estimate of an echo signal using an adaptive filter that models an echo path between a first output port and a second input port of the echo canceller. The delay estimation circuit is configured to compute a first estimate of the echo delay by correlating the estimate of the echo signal with a sending input signal received on the second input port. The delay circuit is configured to time-align the first estimate of the echo signal with the sending input signal based on the echo delay from the delay estimation circuit. The echo cancellation circuit is configured to subtract the time-aligned first estimate of the echo signal from a sending input signal received on the second input port to generate a sending output signal.

The methods and apparatus as herein described reduce the impact of delay variation on the overall performance of the echo canceller. The solutions have low complexity and can be incorporated into existing echo cancellers. The techniques are particularly useful for handling "invisible" delay variation in the path from the echo canceller to the CS network.

DETAILED DESCRIPTION

Figure 1A:
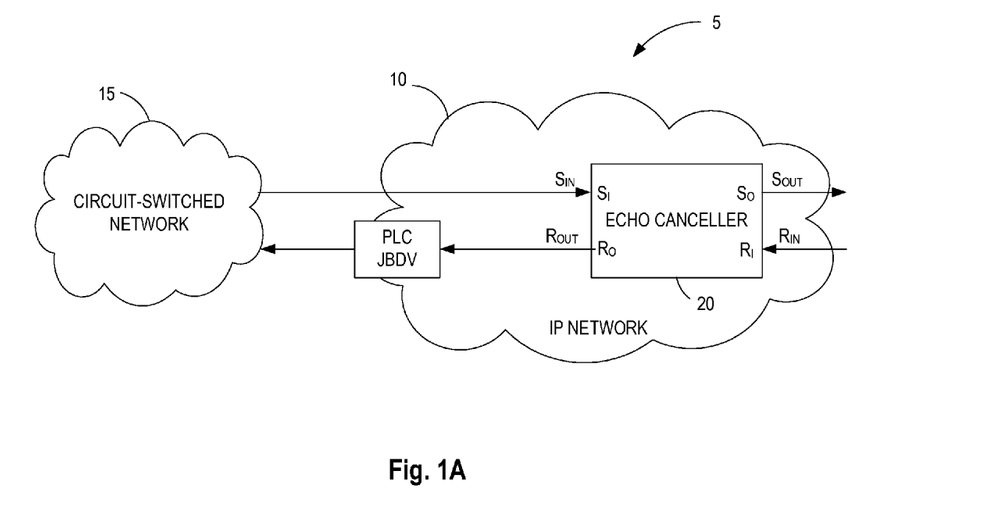
FIGS. 1A and 1B illustrate a network including an echo canceller according to embodiments of this disclosure.
Figure 1B:
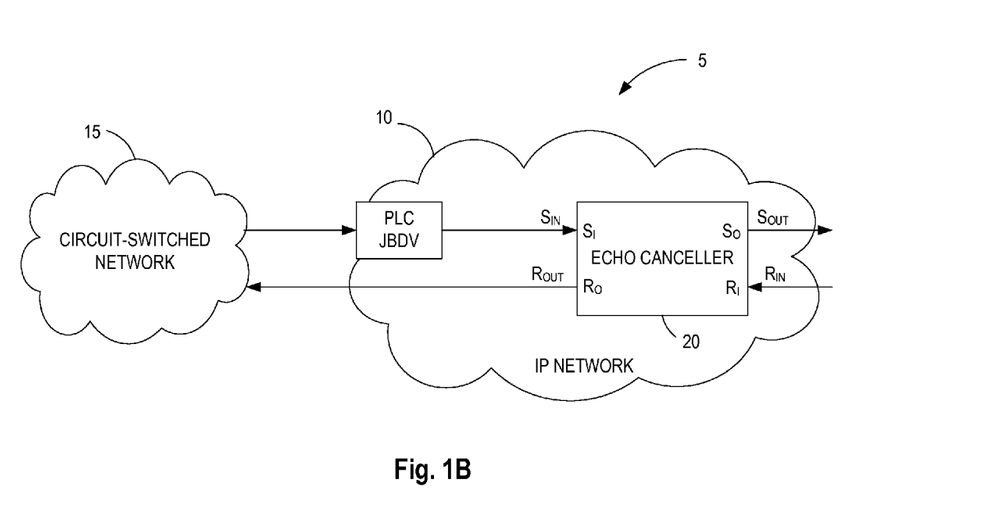

Referring now to the drawings, FIGS. 1A and 1B illustrate an exemplary communication network 5 using an echo canceller 20 as herein described. Various representative embodiments of the echo canceller 20 are described to illustrate the function and operation of the echo canceller 20. For convenience, similar reference numerals are used throughout the Figures to indicate similar elements.

The communication network 5 comprises a mixed network including an Internet Protocol (IP) network 10 or other packet-switched (PS) network, and a circuit-switched (CS) network 15. The echo canceller 20 is located in the IP network 10 along a voice path between a far end user and a near end user. The echo canceller 20 comprises a first input port ($R_I$), a first output port ($R_O$), a second input port ($S_I$), and a second output port ($S_O$). The echo canceller 20 receives a receiving input signal ($R_{IN}$) from the far end user via the $R_I$ port and transmits a receiving output signal ($R_{OUT}$) to the near end user via the $R_O$ port. The echo canceller 20 also receives a sending input signal ($S_{IN}$) from the near end user via the $S_I$ port and transmits a sending output signal ($S_{OUT}$) to the far end user via the $S_O$ port. The job of the echo canceller 20 is to cancel any echo of the $R_{OUT}$ signal that may be present in the $S_{IN}$ signal. To perform this task, the echo canceller 20 uses an adaptive filter to model the echo path and to estimate the echo signal based on the echo path model. The estimated echo signal is subtracted from the $S_{IN}$ signal to generate the $S_{OUT}$ signal.

The deployment of the echo canceller 20 in the IP network 10 creates a problem for the echo canceller 20. Signals transmitted and received over the IP network 10 are subject to impairments such as packet-loss and delay variation (jitter). Packet loss, delay variation, as well as their remedies, i.e. packet-loss concealment (PLC) and jitter buffer delay variation (JBDV) introduce non-linearities into the echo path. PLC and JBDV may be implemented in either the path from the echo canceller 20 to the echo source in the CS network 15 (FIG. 1A), or in the path from the echo source to the echo canceller 20 (FIG. 1B). Because conventional echo cancellers are designed on the assumption that the echo path is linear, these non-linearities may cause the model of the echo path used by a conventional echo canceller to diverge from the correct echo path model. The echo canceller 20 according to embodiments of the present invention is designed to mitigate the effects of packet-loss, jitter, and other impairments on the performance of the echo canceller 20.

Figure 2:
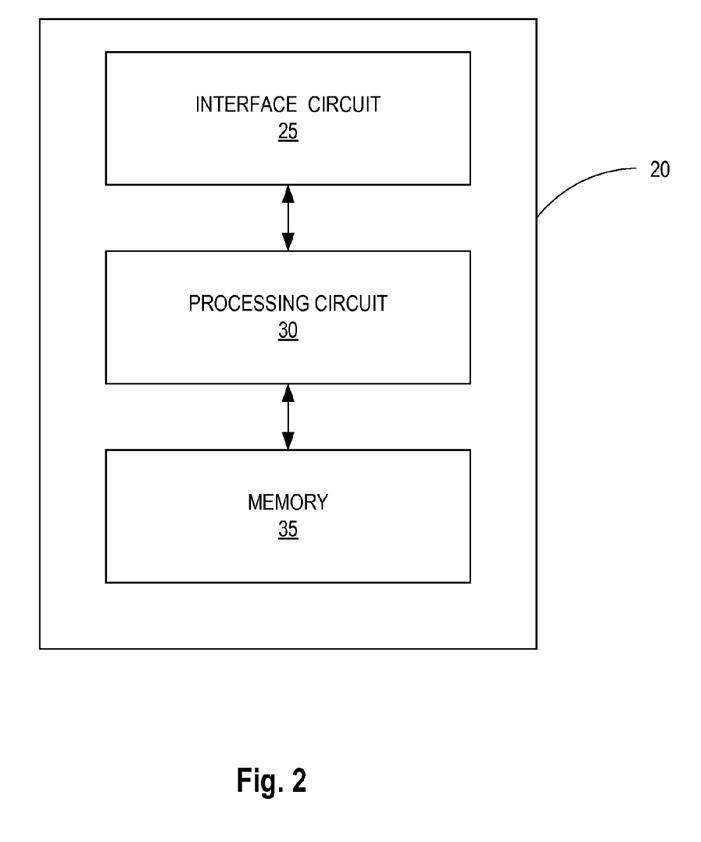
FIG. 2 illustrates the main functional elements of the echo canceller according to a first embodiment.

FIG. 2 illustrates the main functional elements of an echo canceller 20 according to one embodiment of the disclosure. The echo canceller 20 comprises an interface circuit 25, a processing circuit 30, and memory 35. The interface circuit 25 enables the echo canceller 20 to transmit and receive voice signals over the IP network 10. The processing circuit 30 processes the voice signals being transmitted and received to perform echo cancellation. The processing circuit 30 may comprise one or more microprocessors, hardware, firmware, or a combination thereof. As will be hereinafter described in more detail, the processing circuit 30 is configured to detect variation in the echo delay and to mitigate the effects of the delay variation on the output of the echo canceller 20. The memory 35 stores program instruction and data used by the processing circuit 30 to perform its functions. Memory 35 may comprise both volatile memory, e.g., random access memory (RAM), and non-volatile memory such a read-only memory (ROM) and Flash memory. Memory 35 may be implemented as stacked memory, or as discrete memory devices.

Figure 3:
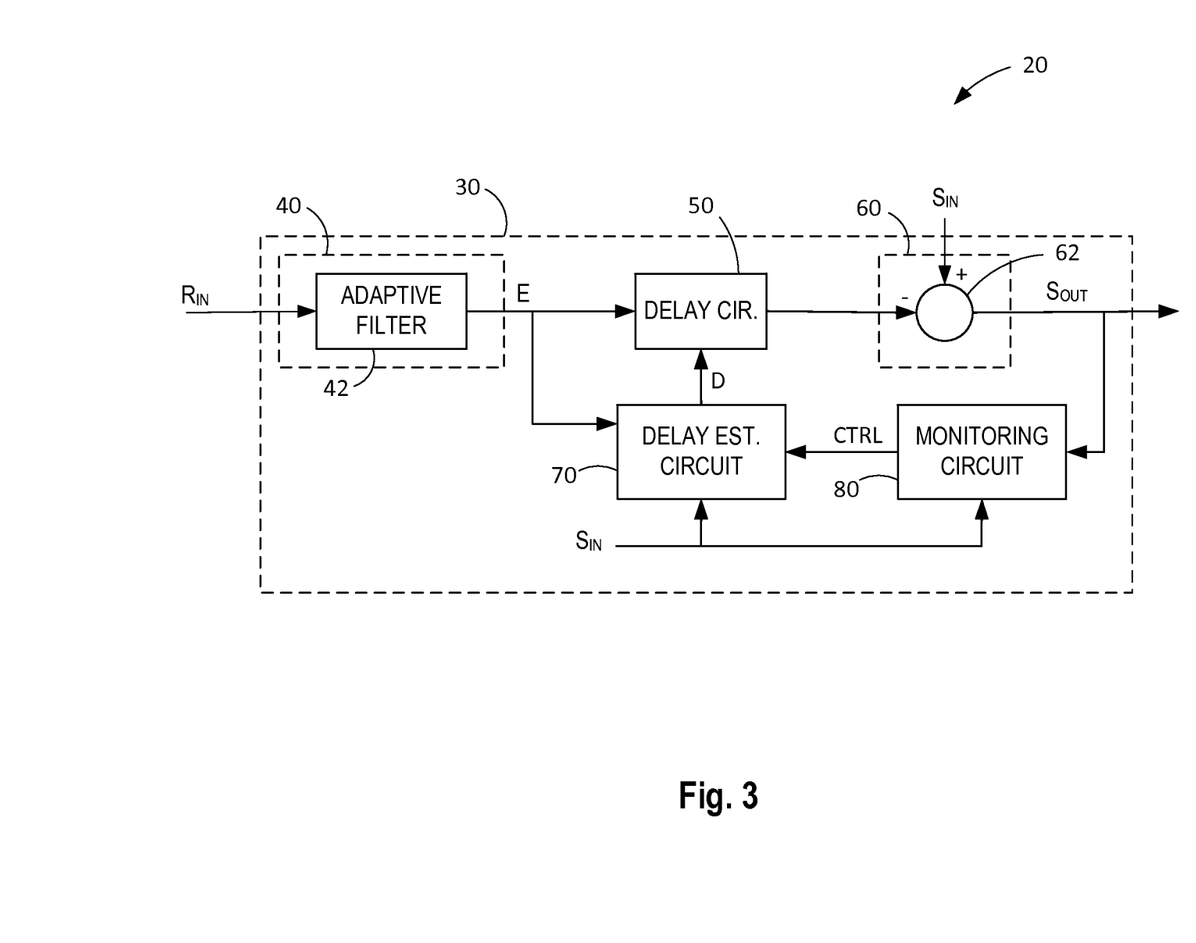
FIG. 3 illustrates functional elements of a processing circuit for an echo canceller.

FIG. 3 illustrates the main functional elements of a processing circuit 30 for the echo canceller 20 according to a first embodiment. The processing circuit 30 comprises a filter circuit 40, a delay circuit 50, an echo cancellation circuit 60, a delay estimation circuit 70, and a monitoring circuit 80. The $R_{IN}$ signal received via the interface circuit 25 is applied to the filter circuit 40. The filter circuit 40 comprises an adaptive filter 42 that models the echo path between the $R_{OUT}$ port and the $S_{IN}$ port. The adaptive filter 42 may, for example, comprise a Least-Mean-Square (LMS) filter or other adaptive filter known in the art. The adaptive filter 42 filters the $R_{IN}$ signal to generate an estimate E of the echo signal. The estimate E of the echo signal output by the filter circuit 40 is input to the delay circuit 50.

The delay circuit 50 is configured to time-align the estimate E of the echo signal with the $S_{IN}$ signal based on a current estimate D of the echo delay provided by the delay estimation circuit 70. The time-aligned estimate E of the echo signal is output to the echo cancellation circuit 60.

The echo cancellation circuit 60 cancels the echo signal present in the $S_{IN}$ signal to generate the $S_{OUT}$ signal. The echo cancellation circuit 60 comprises an adding circuit 62 configured to subtract the estimate E of the echo signal from the $S_{IN}$ signal to generate the $S_{OUT}$ signal. Assuming that the estimate E of the echo signal is a close approximation of the actual echo signal, subtracting the estimate E of the echo signal from the $S_{IN}$ signal cancels the echo signal.

Figure 4:
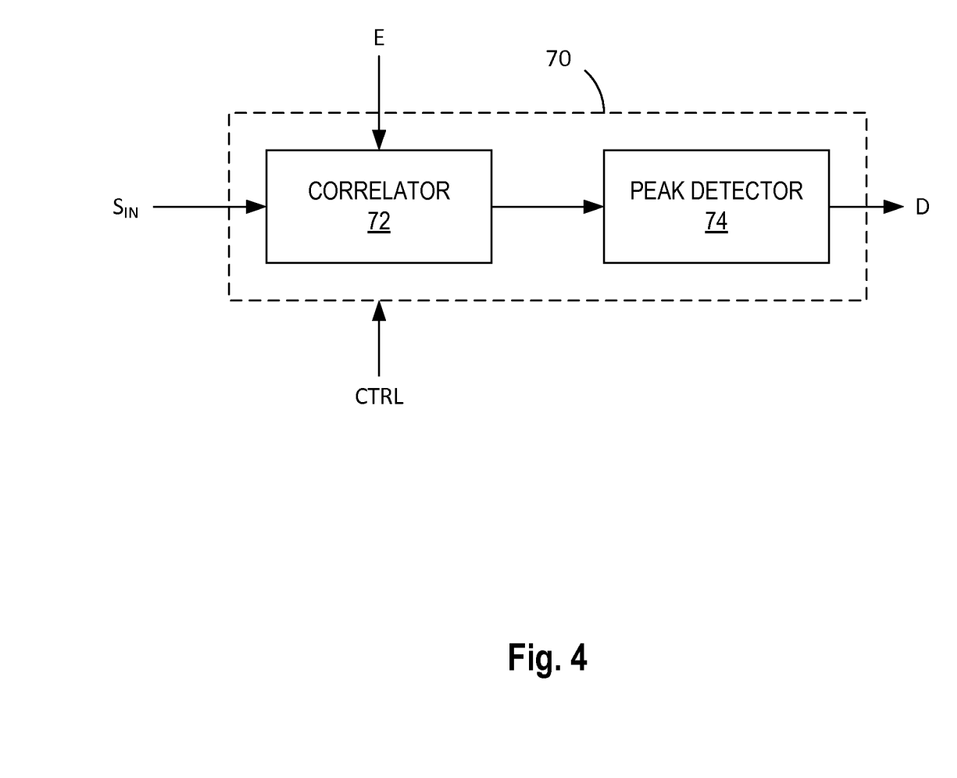
FIG. 4 illustrates functional elements of a delay estimation circuit for estimating an echo delay.

The delay estimation circuit 70, when enabled, estimates the echo delay and outputs the estimated echo delay D to the delay circuit 50. The estimate E of the echo signal output from the filter circuit 40 and the $S_{IN}$ signal are input to the delay estimation circuit 70. The delay estimation circuit 70, shown in FIG. 4, comprises a correlator 72 and a peak detector 74. The correlator 72 computes the correlation of the estimate E of the echo signal with the $S_{IN}$ signal and outputs a correlation signal to the peak detector 74. The correlation signal represents a correlation between the estimate E of the echo signal and the $S_{IN}$ signal at different time delays. A strong correlation will result in a peak in the correlation signal. The peak detector 74 processes the correlation signal to locate the strongest peak in the correlation signal. The time delay associated with the detected peak is taken as the current estimate D of the echo delay.

The monitoring circuit 80 detects echo delay variation and controls the delay circuit 50 and delay estimation circuit 70. If the change in the delay has occurred in the CS-to-IP path, variation in the echo delay may be detected based on the changes in the length of the jitter buffer. In this case, the amount of the delay variation is known and the delay circuit 50 can be configured without the need to enable the delay estimation circuit 70. If the delay has occurred in the IP-to-CS path, detection of the delay is more difficult. One aspect of the disclosure comprises techniques for detecting delay variation in the IP-to-CS.

Assuming the adaptive filter 42 has converged to a stable echo path model, a sudden or abrupt change in the echo delay will cause the $S_{OUT}$ signal to contain two echoes; one from the original echo in the $S_{IN}$ signal and the other from the extra echo component resulting from the misalignment (caused by the change in the echo delay) of the adaptive filter. Because of the extra echo component, the echo return loss enhancement (ERLE) will become negative. The monitoring circuit 80 monitors the ERLE. When the ERLE becomes negative, the monitoring circuit 80 enables the delay circuit 50 and delay estimation circuit 70 to time-align the estimate E of the echo signal with the $S_{IN}$ signal so that the echo signal can be cancelled more effectively, rather than relying on the adaptive filter 42 to converge to the new echo path. The adaptive filter 42 may also be realigned with the $S_{IN}$ signal to compensate for the sudden change in the echo delay by shifting the taps of the adaptive filter 42 so that it is ready to resume operation in the subsequent packets without re-adaptation.

Figure 5:
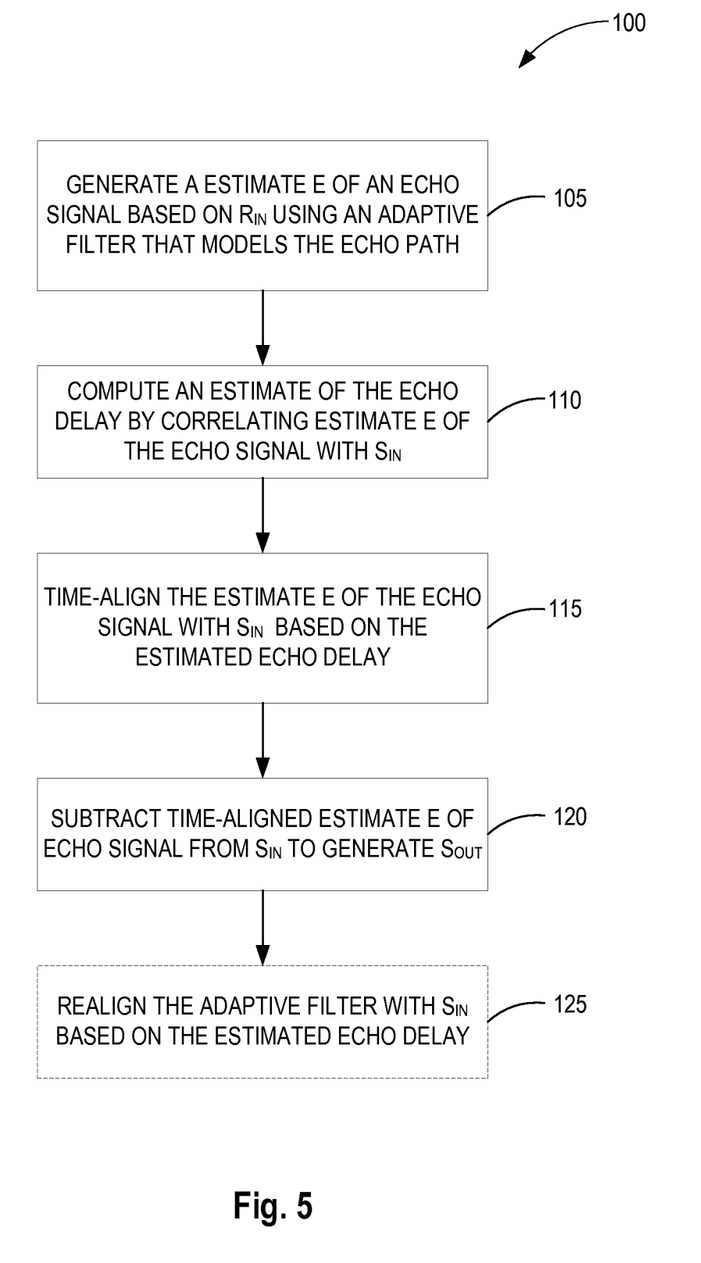
FIG. 5 illustrates a method implemented by the echo canceller depicted in FIGS. 3 and 4.

FIG. 5 illustrates an exemplary method 100 implemented by the echo canceller 20. The $R_{IN}$ signal is input to a filter circuit 40 including an adaptive filter 42. The adaptive filter 42 generates an estimate E of the echo signal based on a model the echo path (block 105). The estimate E of the echo signal output from the filter circuit 40 is input to a delay circuit 50 and a delay estimation circuit 70. The delay estimation circuit 70 computes an echo delay by correlating the estimate E of the echo signal with the $S_{IN}$ signal (block 110). The delay circuit 50 time-aligns the estimate E of the echo signal with the $S_{IN}$ signal based on the estimated echo delay D (block 115). The echo cancellation circuit 60 subtracts the time-aligned estimate E of the echo signal from the $S_{IN}$ signal to generate the $S_{OUT}$ signal (block 120). In some embodiments, the filter circuit 40 may also realign the taps of the adaptive filter 42 based on the estimated echo delay D so the adaptive filter 42 is ready to resume operation in the subsequent packets without re-adapting (block 125).

Figure 6:
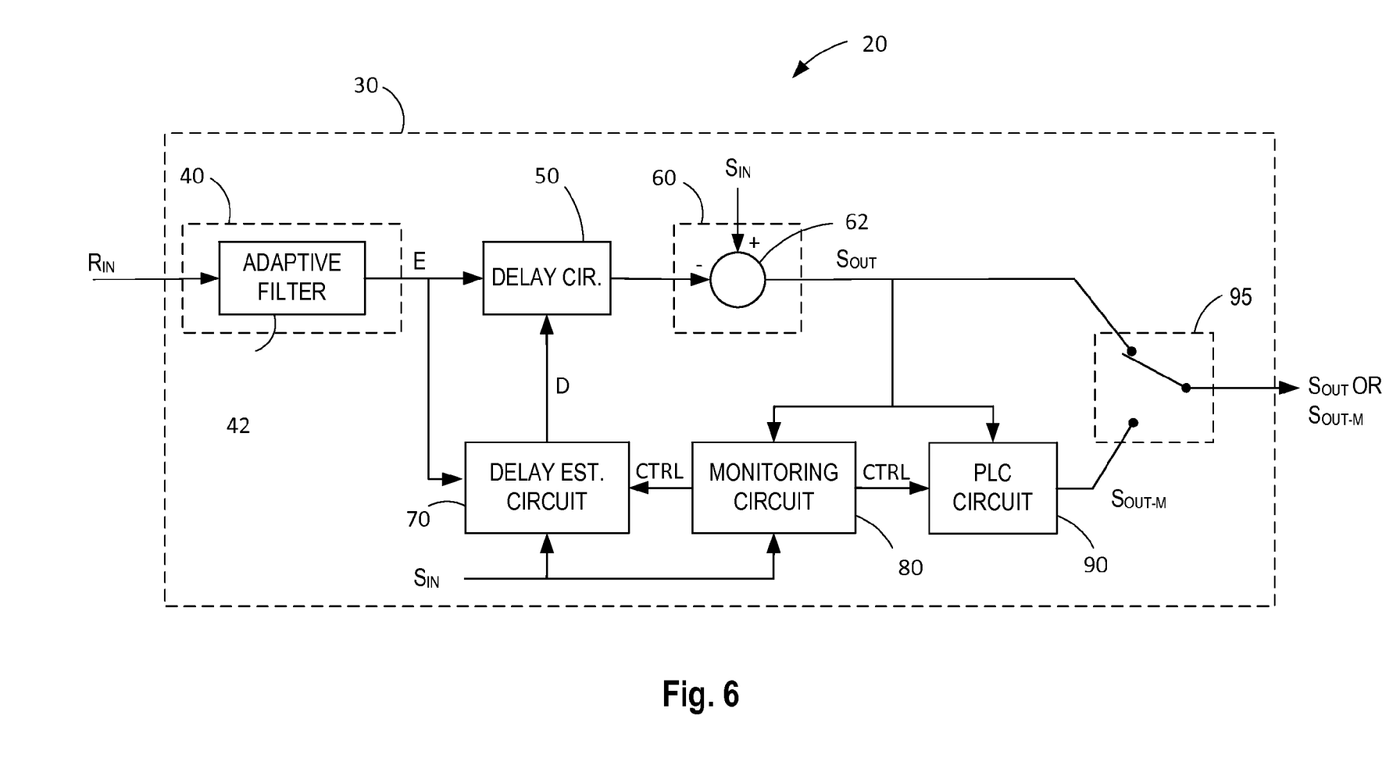
FIG. 6 illustrates the main functional elements of a processing circuit for an echo canceller according to a second embodiment.

FIG. 6 illustrates a processing circuit 30 for another embodiment of the echo canceller 20 configured to handle packet loss as well as delay variation. Typically, when a packet is lost, PLC is applied to the $R_{OUT}$ signal or to the $S_{IN}$ signal to generate a loss-concealment packet to conceal the lost packet. The loss-concealment packet is generated using information in the previously received packets. Voice samples in the loss-concealment packet are unlikely to be the same as the as the actual voice samples in the lost packet. Although packet loss mostly occurs in isolated packets, it will cause a noticeable artifact in the $S_{OUT}$ signal.

Should the packet loss occur in the IP-to-CS path, the it may cause the adaptive filter 42 in the echo canceller 20 to diverge from the converged echo path model because the $R_{IN}$ signal, which is used as a reference signal, does not undergo PLC processing. Once the adaptive filter 42 diverges, the echo cannot be cancelled completely and a residual echo will remain after cancellation until the adaptive filter 42 re-converges back to the echo path model. The residual echo may last for several packets after a packet loss occurs.

The processing circuit 30 shown in FIG. 6 comprises a filter circuit 40, a delay circuit 50, an echo cancellation circuit 60, a delay estimation circuit 70, a monitoring circuit 80, a packet loss concealment circuit 90, and a selection circuit 95. The $R_{IN}$ signal received via the interface circuit 25 is applied to the filter circuit 40. The filter circuit 40 comprises an adaptive filter 42 that models the echo path between the $R_{OUT}$ port and the $S_{IN}$ port. The adaptive filter 42 may, for example, comprise a Least-Mean-Square (LMS) filter or other adaptive filter known in the art. The adaptive filter 42 filters the $R_{IN}$ signal to generate an estimate E of the echo signal. The estimate E of the echo signal output by the filter circuit 40 is input to the delay circuit 50.

The delay circuit 50 is configured to time-align the estimate E of the echo signal with the $S_{IN}$ signal based on a current estimate D of the echo delay provided by the delay estimation circuit 70. The time-aligned estimate E of the echo signal is output to the echo cancellation circuit 60.

The echo cancellation circuit 60 cancels the echo signal present in the $S_{IN}$ signal to generate the $S_{OUT}$ signal. The echo cancellation circuit 60 comprises an adding circuit 62 configured to subtract the estimate E of the echo signal from the $S_{IN}$ signal to generate the $S_{OUT}$ signal. Assuming that the estimate E of the echo signal is a close approximation of the actual echo signal, subtracting the estimate E of the echo signal from the $S_{IN}$ signal cancels the echo signal.

The delay estimation circuit 70, when enabled, estimates the echo delay and outputs the estimated echo delay D to the delay circuit 50. The delay estimation circuit 70 operates the same as previously described.

The monitoring circuit 80 detects variation in the echo delay and controls the delay circuit 50 and delay estimation circuit 70. The monitoring circuit 80 monitors the ERLE. When the ERLE becomes negative, indicating a change in the echo delay, the monitoring circuit 80 enables the delay circuit 50 and delay estimation circuit 70 to time-align the estimate E of the echo signal with the $S_{IN}$ signal so that the echo signal can be cancelled more effectively, rather than relying on the adaptive filter 42 to converge to the new echo path.

The monitoring circuit 80 is further configured to detect packet loss in the echo path. If no packet loss is detected, the selection circuit 95 is controlled to output the $S_{OUT}$ signal from the echo cancellation circuit 60. If a lost packet is detected, the monitoring circuit 80 enables the packet loss concealment circuit 90, which is normally disabled. The $S_{OUT}$ signal is input to the packet loss concealment circuit 90. The packet loss concealment circuit 90 modifies the $S_{OUT}$ signal to include a loss-concealment packet. The loss-concealment packet is generated based on previous packets in the $S_{OUT}$ signal. The selection circuit 95 is controlled to output the modified $S_{OUT}$ signal in place of the $S_{OUT}$ signal.

Figure 7:
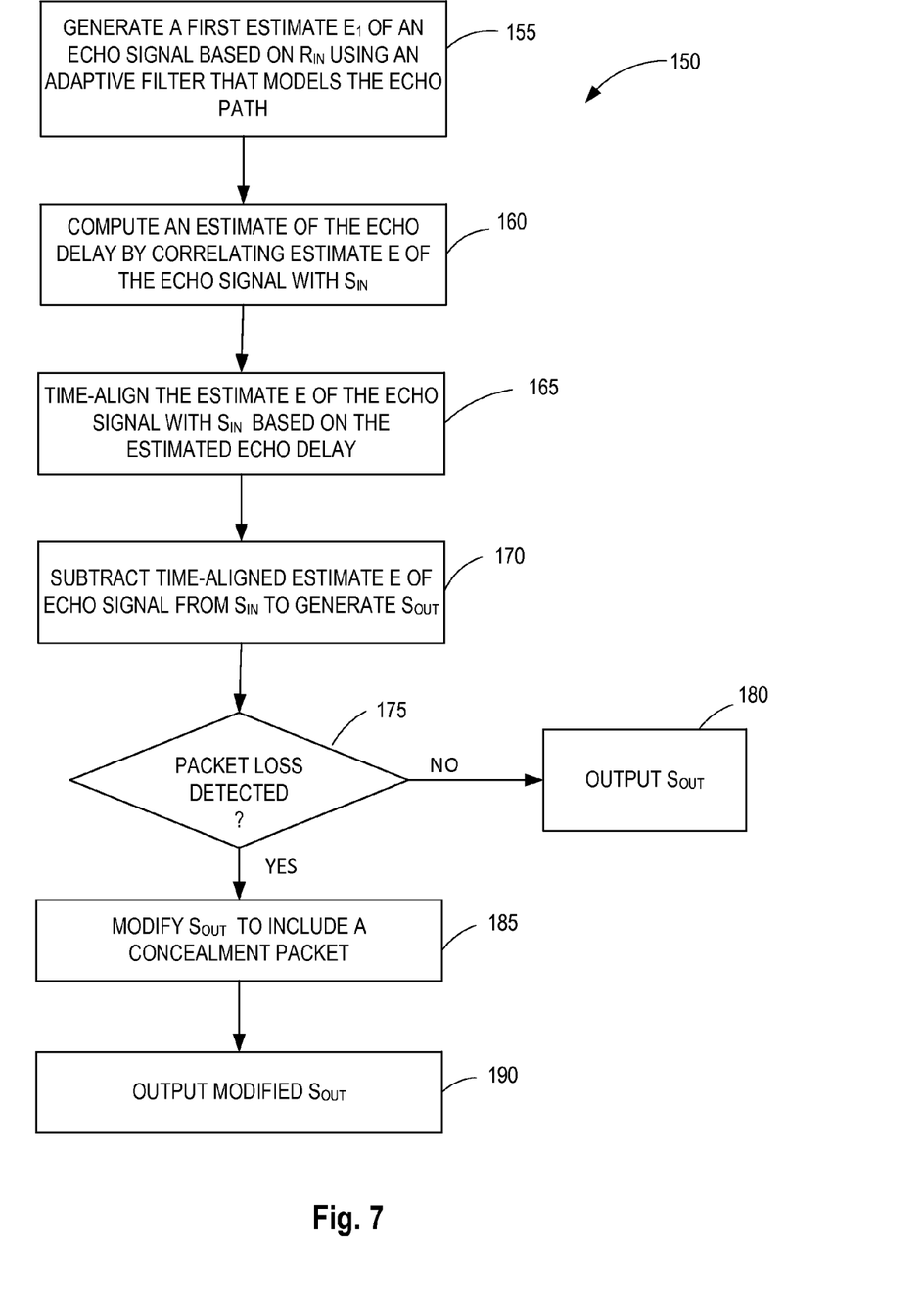
FIG. 7 illustrates a method implemented by the echo canceller depicted in FIG. 6.

FIG. 7 illustrates an exemplary method 150 implemented by the echo canceller shown in FIG. 6. The $R_{IN}$ signal is input to a filter circuit 40 including an adaptive filter 42. The adaptive filter 42 generates an estimate E of the echo signal based on the $R_{IN}$ signal using an adaptive filter that models the echo path (block 155). The estimate E of the echo signal output from the adaptive filter 42 is input to a delay circuit 50 and a delay estimation circuit 70. The delay estimation circuit 70 computes an echo delay by correlating the estimate E of the echo signal with the $S_{IN}$ signal (block 160). The delay circuit 50 time-aligns the estimate E of the echo signal with the $S_{IN}$ signal based on the estimated echo delay D (block 165). The echo cancellation circuit 60 subtracts the time-aligned estimate E of the echo signal from the $S_{IN}$ signal to generate the $S_{OUT}$ signal (block 170). The monitoring circuit 80 detects packet loss in the echo path (block 175). If no packet loss is detected, the echo canceller 20 outputs the $S_{OUT}$ signal from the echo cancellation circuit 50 (block 180). If packet loss is detected, the packet loss concealment circuit 90 of the echo canceller 20 modifies the $S_{OUT}$ signal to include a loss-concealment packet (block 185). The modified $S_{OUT}$ signal is output by the echo canceller 20 in place of the original $S_{OUT}$ signal (block 190).

Figure 8:
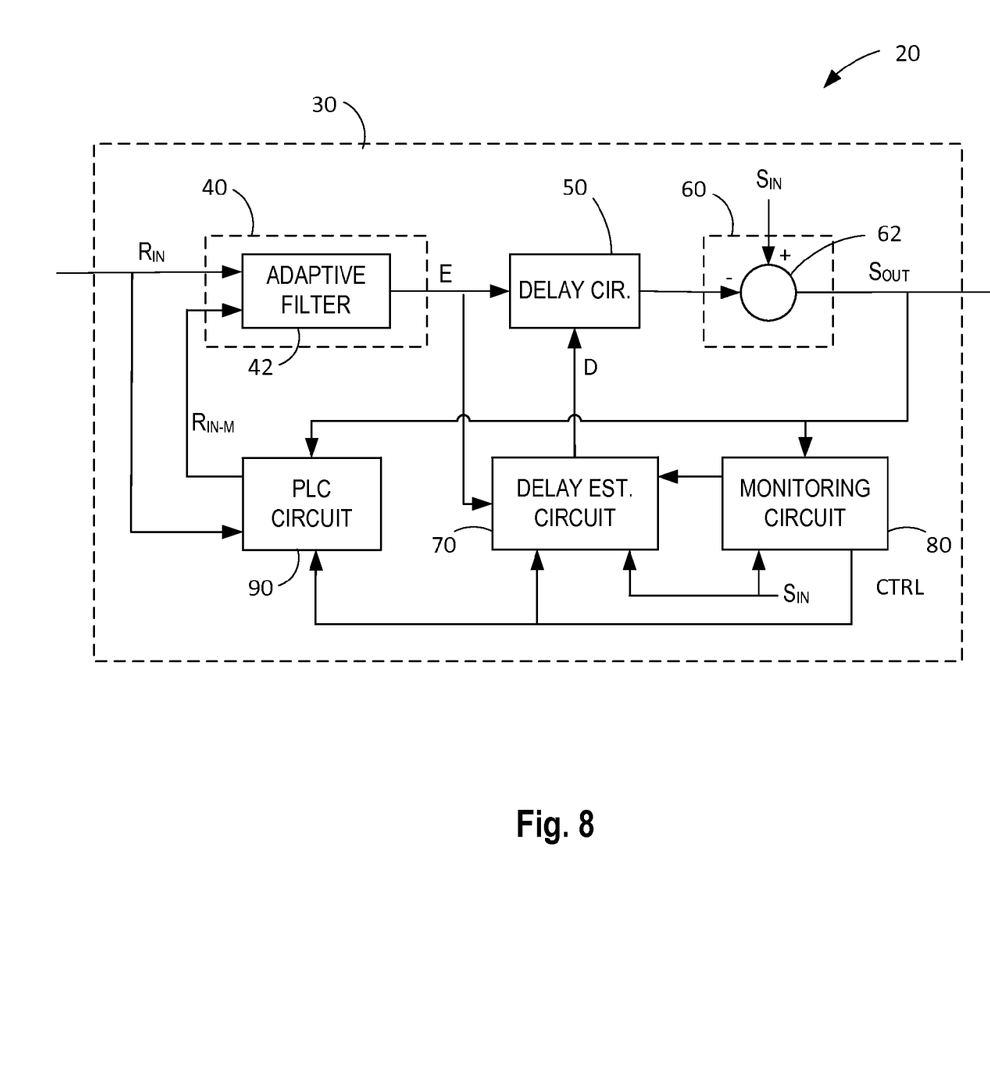
FIG. 8 illustrates the main functional elements of a processing circuit for an echo canceller according to a third embodiment.

FIG. 8 illustrates another embodiment of the echo canceller 20 that invokes packet loss concealment on the $R_{IN}$ signal when packet loss is detected in the IP-to-CS path. The processing circuit 30 in this embodiment comprises a filter circuit 40, a delay circuit 50, an echo cancellation circuit 60, a delay estimation circuit 70, a monitoring circuit 80, and a packet loss concealment circuit 90. The $R_{IN}$ signal received via the interface circuit 25 is applied to the filter circuit 40. The filter circuit 40 comprises an adaptive filter 42 that models the echo path between the $R_{OUT}$ port and the $S_{IN}$ port. The adaptive filter 42 may, for example, comprise a Least-Mean-Square (LMS) filter or other adaptive filter known in the art. The adaptive filter 42 filters the $R_{IN}$ signal to generate an estimate E of the echo signal. The estimate E of the echo signal output by the filter circuit 40 is input to the delay circuit 50.

The delay circuit 50 is configured to time-align the estimate E of the echo signal with the $S_{IN}$ signal based on a current estimate D of the echo delay provided by the delay estimation circuit 70. The time-aligned estimate E of the echo signal is output to the echo cancellation circuit 60.

The echo cancellation circuit 60 cancels the echo signal present in the $S_{IN}$ signal to generate the $S_{OUT}$ signal. The echo cancellation circuit 60 comprises an adding circuit 62 configured to subtract the estimate E of the echo signal from the $S_{IN}$ signal to generate the $S_{OUT}$ signal. Assuming that the estimate E of the echo signal is a close approximation of the actual echo signal, subtracting the estimate E of the echo signal from the $S_{IN}$ signal cancels the echo signal.

The delay estimation circuit 70, when enabled, estimates the echo delay and outputs the estimated echo delay D to the delay circuit 50. The delay estimation circuit 70 operates the same as previously described.

The monitoring circuit 80 detects variation in the echo delay and controls the delay circuit 50 and delay estimation circuit 70. The monitoring circuit 80 monitors the ERLE. When the ERLE becomes negative, indicating a change in the echo delay, the monitoring circuit 80 enables the delay circuit 50 and delay estimation circuit 60 to time-align the estimate E of the echo signal with the $S_{IN}$ signal so that the echo signal can be cancelled more effectively, rather than relying on the adaptive filter 42 to converge to the new echo path. The adaptive filter 42 may also be realigned with the $S_{IN}$ signal to compensate for the sudden change in the echo delay by shifting the taps of the adaptive filter 42 so that it is ready to resume operation in the subsequent packets without re-adaptation.

The monitoring circuit 80 is further configured to detect packet loss in the echo path. If no packet loss is detected, the $S_{OUT}$ signal is output by the echo canceller 20. If a lost packet is detected, the monitoring circuit 80 enables the packet loss concealment circuit 90, which is normally disabled. The $R_{IN}$ signal is input to the packet loss concealment circuit 90. The packet loss concealment circuit 90 includes a buffer to store a predetermined number of packets of the $R_{IN}$ signal. When a packet loss is detected, the packet loss concealment circuit 90 uses the estimated echo delay to determine the location of a target packet in the $R_{IN}$ signal corresponding to the packet of the $S_{IN}$ signal affected by the packet loss. The packet loss concealment circuit 90 then replaces the target packet of the $R_{IN}$ signal with a loss-concealment packet to generate a modified $R_{IN}$ signal. The loss-concealment packet is generated based on previously output packets in the $R_{IN}$ signal. The adaptive filter 42 then regenerates the estimate E of the echo signal based on the modified $R_{IN}$ signal. The regenerated estimate E of the echo is then subtracted from the $S_{IN}$ signal by the echo cancellation signal 50 to obtain a new $S_{OUT}$ signal, which is output in place of the original $S_{OUT}$ signal.

Figure 9:
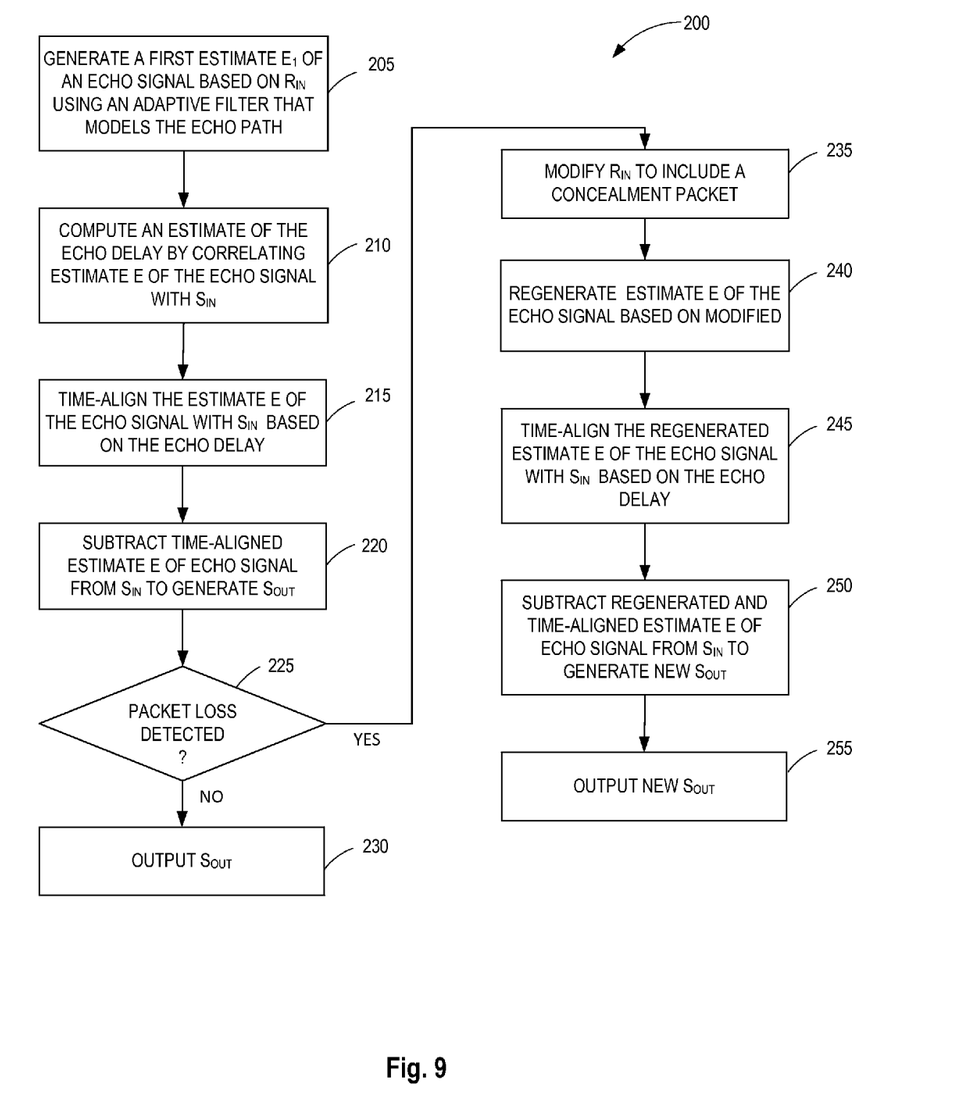
FIG. 9 illustrates a method implemented by the echo canceller depicted in FIG. 8.

FIG. 9 illustrates an exemplary method 200 implemented by the echo canceller shown in FIG. 8. The $R_{IN}$ signal is input to a filter circuit 40 including an adaptive filter 42. The adaptive filter 42 generates an estimate E of the echo signal based on the $R_{IN}$ signal using an adaptive filter that models the echo path (block 205). The estimate E of the echo signal output from the adaptive filter 42 is input to a delay circuit 50 and a delay estimation circuit 70. The delay estimation circuit 70 computes an echo delay by correlating the estimate E of the echo signal with the $S_{IN}$ signal (block 210). The delay circuit 50 time-aligns the estimate E of the echo signal with the $S_{IN}$ signal based on the estimated echo delay D (block 215). The echo cancellation circuit 60 subtracts the time-aligned estimate E of the echo signal from the $S_{IN}$ signal to generate the $S_{OUT}$ signal (block 220). The monitoring circuit 80 detects packet loss in the echo path (block 225). If no packet loss is detected, the echo canceller 20 outputs the $S_{OUT}$ signal from the echo cancellation circuit 50 (block 230). If packet loss is detected, the packet loss concealment circuit 90 of the echo canceller 20 modifies the $R_{IN}$ signal to include a loss-concealment packet (block 235). The modified $R_{IN}$ signal is input to the filter circuit 40. The adaptive filter 42 regenerates the estimate E of the echo signal based on the modified $R_{IN}$ signal (block 240). The regenerated estimate E of the echo signal output from the adaptive filter 42 is input to the delay circuit 50. The delay circuit 50 time-aligns the estimate E of the echo signal with the $S_{IN}$ signal based on the estimated echo delay D (block 245). The echo cancellation circuit 60 subtracts the regenerated and time-aligned estimate E of the echo signal from the $S_{IN}$ signal to generate a new $S_{OUT}$ signal (block 250). The echo canceller outputs the new $S_{OUT}$ signal (block 255).

Figure 10:
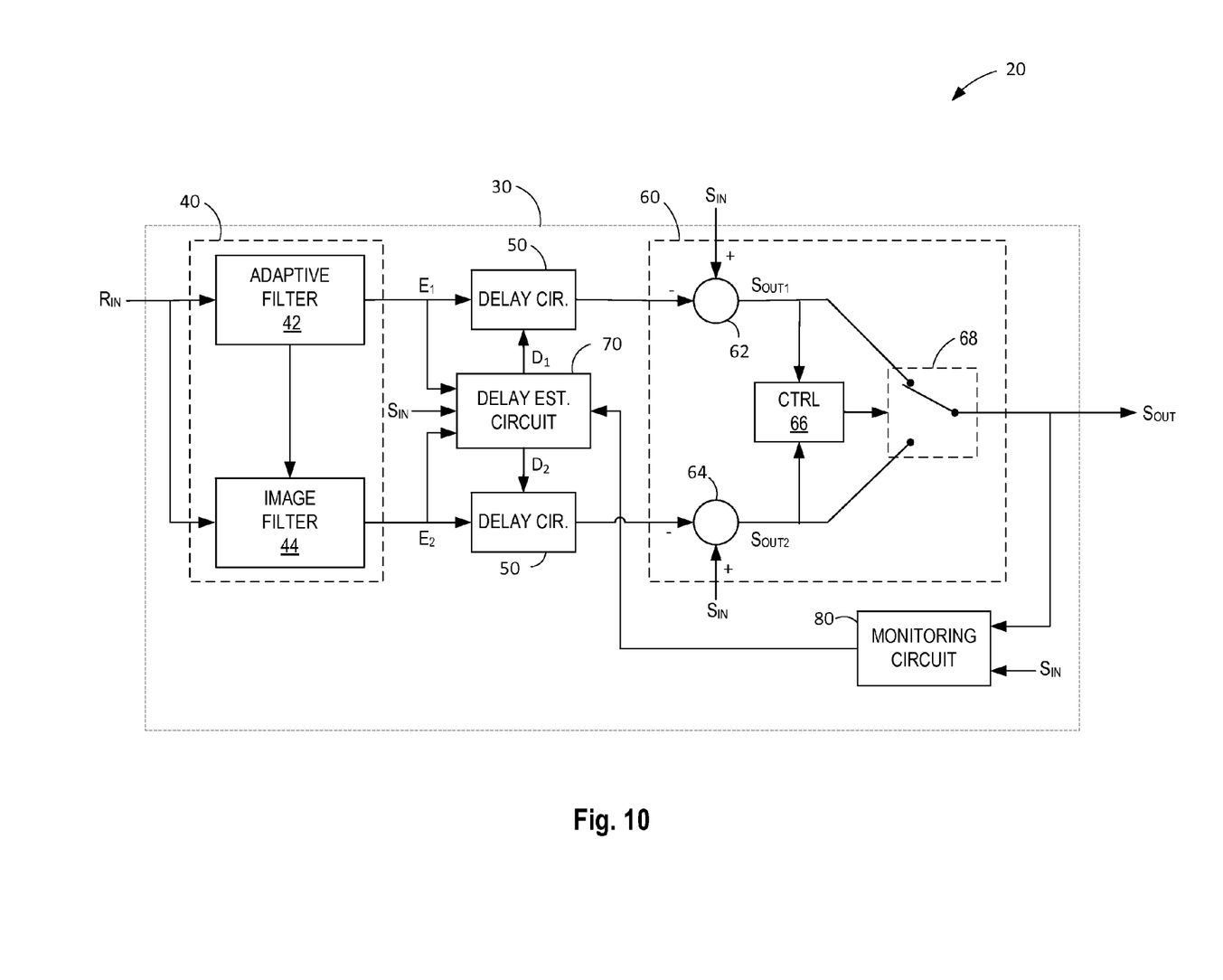
FIG. 10 illustrates the main functional elements of a processing circuit for an echo canceller according to a fourth embodiment.

FIG. 10 illustrates another embodiment that uses an image filter 44 to suppress residual echo in the $S_{OUT}$ signal due to divergence of the adaptive filter 42. The image filter 44 stores a stable and converged copy of the adaptive filter 42. Because the echo path does not change before and after the packet loss, the image filter 44 may be used to generate an estimate of the echo signal when the adaptive filter 42 has diverged. Because the image filter 44 is not affected by the packet loss, the overall performance of the echo canceller 20 is improved.

The processing circuit 30 for the embodiment of the echo canceller 20 shown in FIG. 10 comprises a filter circuit 40, a delay circuit 50, a delay estimation circuit 60, an echo cancellation circuit 70, and a monitoring circuit 80. The filter circuit 40 comprises an adaptive filter 42 as previously described and an image filter 44. The adaptive filter 42 models the echo path between the $R_O$ port and the $S_I$ port of the echo canceller 20. The $R_{IN}$ signal is input to the adaptive filter 42 to generate a first estimate $E_1$ of the echo signal. The image filter 44 stores a stable and converged copy of the echo model used by the adaptive filter 42. The image filter 44 filters the $R_{IN}$ signal to generate a second estimate $E_2$ of the echo signal. The first and second estimates $E_1$ and $E_2$ of the echo signal are input to the delay circuit 50.

The delay circuit 50 is configured to time-align the estimates $E_1$ and $E_2$ of the echo signal with the $S_{IN}$ signal based on current estimates $D_1$ and $D_2$ of the echo delay provided by the delay estimation circuit 70. The first echo delay estimate $D_1$ is used by the delay circuit 50 to time-align the first estimate $E_1$ of the echo signal with the $S_{IN}$ signal. The second echo delay estimate $D_2$ is used by the delay circuit 50 to time-align the second estimate $E_2$ of the echo signal with the $S_{IN}$ signal. The time-aligned estimates $E_1$ and $E_2$ of the echo signal output by the adaptive filter circuit 42 and image filter 44 respectively are applied to the echo cancellation circuit 60.

The delay estimation circuit 70 comprises a correlator 72 and peak detector 74 that operate as previously described to determine first and second estimates $D_1$ and $D_2$ of the echo delay. The correlator 72 correlates the first estimate $E_1$ of the echo signal with the $S_{IN}$ signal to generate a first correlation signal. The correlator 72 also correlates the second estimate $E_2$ of the echo signal with the $S_{IN}$ signal to generate a second correlation signal. The peak detector 74 processes the correlation signals to locate the strongest peaks in the correlation signals. The time delays associated with the detected peaks are taken as the current estimates $D_1$ and $D_2$ of the echo delay.

The echo cancellation circuit 60 computes first and second sending output signals, denoted as the $S_{OUT1}$ and $S_{OUT2}$ signals respectively, using the estimates $E_1$ and $E_2$ of the echo signal. The echo cancellation circuit 60 comprises first and second adding circuits 62 and 64 respectively, control logic 66, and a switching circuit 68. The first adding circuit 62 subtracts the first estimate $E_1$ of the echo signal from the $S_{IN}$ signal to generate the $S_{OUT1}$ signal. The second adding circuit 64 subtracts the second estimate $E_2$ of the echo signal from the $S_{IN}$ signal to generate the $S_{OUT2}$ signal. The echo cancellation circuit 60 selects one of the $S_{OUT1}$ and $S_{OUT2}$ signals to be the final sending output signal, $S_{OUT}$. In one exemplary embodiment, the control logic 66 is configured to compare the $S_{OUT1}$ and $S_{OUT2}$ signals and to select one based on the comparison. As long as the adaptive filter circuit 42 remains in a stable state, the differences between the first and second estimates of the echo signal will be small. Therefore, the differences between the first and second sending output signals will likewise be small. However, when packet-loss or delay variation causes the echo model used by the adaptive filter circuit 42 to diverge, the first estimate $E_1$ output by the adaptive filter circuit 42 will contain a residual echo and the difference between the first and second estimates $E_1$ and $E_2$ of the echo signal will increase due to the residual echo. Divergence of the echo signal can be detected by comparing parameters of the first and second sending output signals that are affected by the residual echo.

In one exemplary embodiment, the control logic 66 is configured to compute the energies of the $S_{OUT1}$ and $S_{OUT2}$ signals and to compare the energies of the $S_{OUT1}$ and $S_{OUT2}$ signals over a predetermined number of packets. The energy of the $S_{OUT1}$ and $S_{OUT2}$ signals over a single packet is given by:

$$E_{SOUT1}(\tau) = \sum_{k=n-N+1}^{n} S_{OUT1}(k)^2$$

$$E_{SOUT2}(\tau) = \sum_{k=n-N+1}^{n} S_{OUT2}(k)^2;$$

where $\tau$ is the packet number, N is the number of samples in a packet, and n is the current index time so that $n=\tau N$. The presence of a residual echo in the $S_{OUT1}$ signal when the adaptive filter diverges will be reflected by increased energy in the $S_{OUT1}$ signal. Thus, by comparing the energy levels of the $S_{OUT1}$ and $S_{OUT2}$ signals over a predetermined number of packets, it can be determined when the adaptive filter 42 is starting to diverge. In one embodiment, divergence is detected when the energy $E_{SOUT1}$ of the $S_{OUT1}$ signal exceeds the energy $E_{SOUT2}$ of the $S_{OUT2}$ signal. The control logic 66 may compare the energy $E_{SOUT1}$ of the $S_{OUT1}$ signal to the energy $E_{SOUT2}$ of the $S_{OUT2}$ signal in the current packet, or may average the energies over a predetermined number of packets (e.g., 2 to 5 packets). When the energy $E_{SOUT1}$ of the $S_{OUT1}$ signal is below the energy $E_{SOUT2}$ of the $S_{OUT2}$ signal, the control logic 66 controls the switching circuit 68 to output the $S_{OUT1}$ signal as the $S_{OUT}$ signal. When the energy $E_{SOUT1}$ of the $S_{OUT1}$ signal exceeds the energy $E_{SOUT2}$ of the $S_{OUT2}$ signal, the control logic 66 controls the switching circuit 68 to output the $S_{OUT2}$ signal as the $S_{OUT}$ signal. In other embodiments, the control logic 56 may compute the difference between the $E_{SOUT1}$ of the $S_{OUT1}$ signal and the energy $E_{SOUT2}$ of the $S_{OUT2}$ signal and compare the difference to a threshold.

In another embodiment of the present disclosure, the control logic 66 may compute a correlation of the $S_{OUT1}$ and $S_{OUT2}$ signals with the $R_{IN}$ signal. In this embodiment, the control logic 66 controls the switching circuit 68 outputs the $S_{OUT1}$ signal or signal $S_{OUT2}$ having the lowest correlation with the $R_{IN}$ signal.

The image filter circuit 44 is intended to contain a stable and good copy of the converged echo path model used by the adaptive filter 42. To minimize the risk of incorrectly updating the image filter 44 with a perturbed or non-converged echo path model (something that can happen due to packet-loss), the image filter 44 should be updated with the adaptive filter content only when the adaptive filter 42 remains stable and converged for a predetermined number of packets, e.g., five packets. In one exemplary embodiment, the update criterion is based on a comparison of the energy levels of the $S_{OUT1}$ and $S_{OUT2}$ signals. In this embodiment, the filter circuit 40 is configured to compare of the energy levels of the $S_{OUT1}$ and $S_{OUT2}$ signals and to update the image filter 44 only when the energy level of the $S_{OUT1}$ signal is less than energy level of the $S_{OUT2}$ signal for five consecutive packets.

The use of an image filter 44 improves performance of echo cancellation considerably. The image filter 44 stores a stable and converged copy of the echo model prior to the packet loss. By comparing levels of the echo estimates from the adaptive filter 42 and image filter 44, it is possible to significantly reduce the residual echo in the $S_{OUT}$ signal in the packets following the packet loss. The cost of the image filter 44 is the amount of FIR filtering to generate an echo estimate from the image filter, as well as memory for the storage of the image filter. The performance improvement is independent of the PLC technique used in the echo path. With the image filter 44, the output of the adaptive filter 42 is no longer used when the echo model diverges. Instead, the echo estimate provided by the image filter 44 is used to generate the $S_{OUT}$ signal until the echo model used by the adaptive filter circuit 42 re-converges. As a result, the amount of the residual echo in the packets following the packet loss is significantly reduced.

Figure 11:
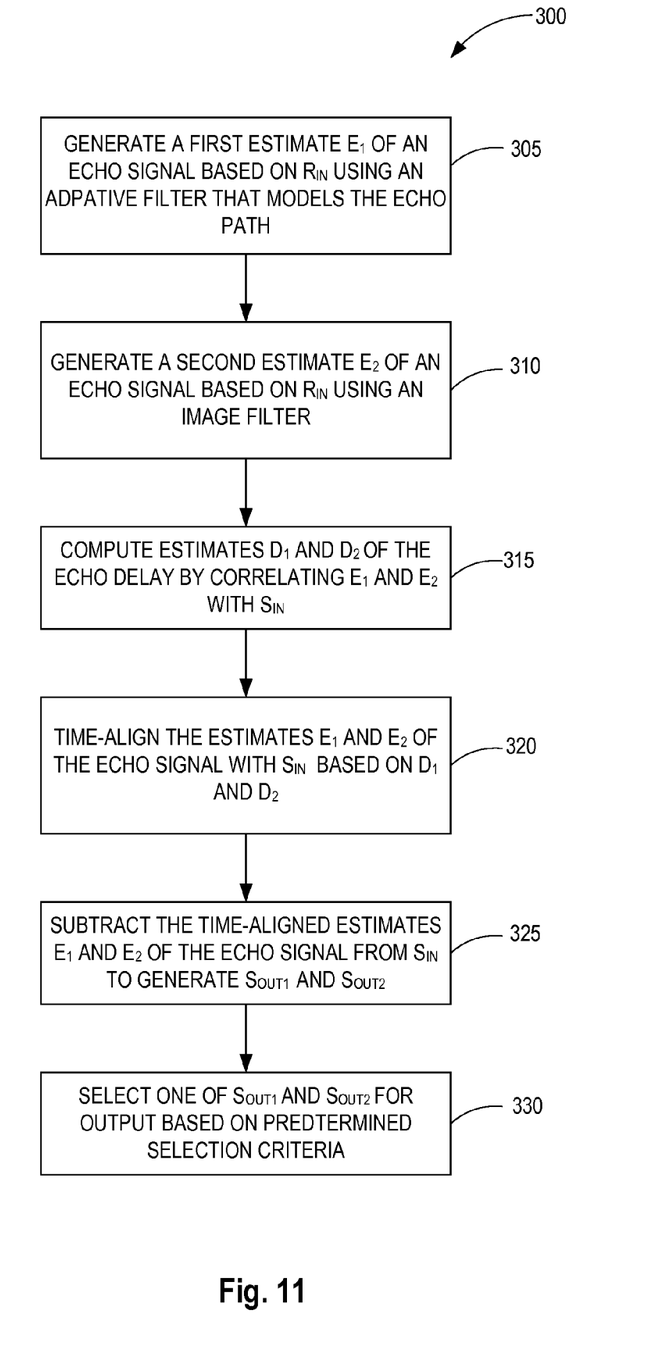
FIG. 11 illustrates a method implemented by the echo canceller depicted in FIG. 10.

FIG. 11 illustrates an exemplary method 300 implemented by the echo canceller 20 in FIG. 10. The $R_{IN}$ signal is input to a filter circuit 40 including an adaptive filter 42. The adaptive filter 42 of the echo canceller 20 generates a first estimate $E_1$ of the echo signal based on $R_{IN}$ using an adaptive filter 42 that models the echo path (block 305). The image filter 44 generates a second estimate $E_2$ of the echo signal based on $R_{IN}$ using an image filter (block 310). The delay estimation circuit 70 computes the echo delays $D_1$ and $D_2$ by correlating the echo estimates $E_1$ and $E_2$ with the $S_{IN}$ signal (block 315). A delay circuit 50 delays the first and second estimates $E_1$ and $E_2$ of the echo signal based on corresponding estimates $D_1$ and $D_2$ of the current echo delay to time-align the first and second estimates $E_1$ and $E_2$ of the echo signal with the $S_{IN}$ signal (block 320). The echo cancellation circuit 60 subtracts the time-aligned estimates $E_1$ and $E_2$ of the echo signal from $S_{IN}$ to generate the $S_{OUT1}$ and $S_{OUT2}$ signals (block 325). The echo cancellation circuit 60 selects one of the $S_{OUT1}$ and $S_{OUT2}$ signals as the final $S_{OUT}$ signal depending on a predetermined selection criterion. For example, the echo cancellation circuit 60 may output one of $S_{OUT1}$ and $S_{OUT2}$ signals with the lowest energy in the current packet, or the one with the lowest average energy over a predetermined number of packets.

In other embodiments of the disclosure, the image filter 44 as illustrated in FIG. 10 may be used in combination with packet loss concealment on the $S_{OUT}$ signal as shown in FIG. 6, or with packet loss concealment on the $R_{IN}$ signal as shown in FIG. 8.

The embodiments of the echo canceller 20 disclosed herein are able to handle delay variation much more effectively than relying on the adaptation of the echo model by the adaptive filter 42. Upon detection of a change in the echo delay, the delay circuit 50 can time-align the estimate or estimates of the echo signal with the $S_{IN}$ signal to improve echo cancellation performance. Additionally, the adaptive filter 42 can be realigned with the $S_{IN}$ signal so that the adaptive filter 42 is ready to process the subsequent packets. Adjusting the time delay of the adaptive filter 42 enables it to continue operation in the subsequent packets without readapting.

The techniques herein described can be applied as enhancements to existing echo cancellers to reduce the development effort necessary to allow well-established echo cancellers to function with IP network impairments and to preserve fundamental performance and adaptation characteristics of existing/field-proven echo cancellers. Further, techniques herein offer a low complexity solution as compared to the complexity of a typical echo canceller. Thus, the increase in the overall echo canceller complexity to incorporate the techniques is small. The techniques described in this disclosure can also be applied to handle acoustic echo. That is, the techniques can be used to enhance the capability of existing acoustic echo control algorithms to allow their deployment in environments where IP impairments may occur.

What is claimed is:

1. A method of echo cancellation to handle variation of an echo delay, said method comprising:
   generating, from a receiving input signal received over an Internet Protocol (IP) network at a first input port of an echo canceller, a first estimate of an echo signal using an adaptive filter that models an echo path between a first output port and a second input port of the echo canceller;
   computing a first estimate of the echo delay by correlating the first estimate of the echo signal with a sending input signal received over the IP network at said second input port;
   delaying the first estimate of the echo signal output by the adaptive filter based on the first estimate of the echo delay to time-align the first estimate of the echo signal with the sending input signal; and
   subtracting the time-aligned first estimate of the echo signal from the sending input signal to generate a first sending output signal with reduced echo for output over a second output port of the echo canceller.

2. The method of claim 1 wherein computing the first estimate of the echo delay by correlating the estimate of the echo signal with the sending input signal comprises:
   correlating the first estimate of the echo signal with a sending input signal received on said second input port to generate a correlation signal; and
   computing the first estimate of the echo delay by locating a peak in the correlation signal.

3. The method of claim 1 further comprising:
   detecting variation in the echo delay;
   wherein computing the first estimate of the echo delay comprises computing the estimate of the echo delay responsive to the detection of variation in the echo delay.

4. The method of claim 3 wherein detecting variation in the echo delay comprises:
   computing a performance metric indicative of echo cancellation performance; and
   detecting variation in the echo delay based on the performance metric.

5. The method of claim 4 wherein computing a performance metric comprises computing an echo return loss enhancement.

6. The method of claim 5 wherein detecting variation in the echo delay based on the performance metric comprises comparing the echo return loss enhancement to a threshold.

7. The method of claim 1 further comprising realigning the adaptive filter to compensate for the variation of the echo delay.

8. The method of claim 1 further comprising:
   generating, from the receiving input signal, a second estimate of an echo signal using an image filter that stores a time-delayed copy of the adaptive filter;
   computing a second estimate of the echo delay by correlating the second estimate of the echo signal with the sending input signal;
   delaying the second estimate of the echo signal output by the image filter based on the second estimate of the echo delay to time-align the second estimate of the echo signal with the sending input signal;
   subtracting the time-aligned second estimate of the echo signal from the sending input signal to generate a second sending output signal with reduced echo for output over a second output port of the echo canceller; and
   selecting, based on a predetermined selection criteria, one of the first and second sending output signals for output by the echo canceller.

9. The method of claim 8 wherein selecting one of the first and second sending output signals for output by the echo canceller comprises selecting one of the first and second sending output signals with the lowest energy.

10. The method of claim 8 wherein selecting one of the first and second sending output signals for output by the echo canceller comprises selecting one of the first and second sending output signals having the highest correlation with the sending input signal.

11. The method of claim 1 further comprising:
    detecting packet loss in the echo path; and
    responsive to the detection of the packet loss, modifying the first sending output signal to include a loss-concealment packet.

12. The method of claim 1 further comprising:
    detecting packet loss in the echo path;
    responsive to the detection of the packet loss, modifying the receiving input signal to include a loss-concealment packet; and
    regenerating the first estimate of the echo signal based on the modified receiving input signal.

13. An echo canceller for an Internet Protocol (IP) network comprising:
    a filter circuit comprising an adaptive filter configured to generate, from a receiving input signal received over the IP network at a first input port of the echo canceller, a first estimate of an echo signal using an echo model of an echo path between a first output port and a second input port of the echo canceller;
    a delay estimation circuit configured to compute a first estimate of the echo delay by correlating the estimate of the echo signal with a sending input signal received over the IP network at said second input port;
    a delay circuit configured to delay the first estimate of the echo signal output by the adaptive filter based on the echo delay to time-align the first estimate of the echo signal with the sending input signal; and
    an echo cancellation circuit configured to subtract the time-aligned first estimate of the echo signal from a sending input signal received on said second input port to generate a first sending output signal.

14. The echo canceller of claim 13 wherein the delay estimation circuit is configured to compute the first estimate of the echo delay by:
    correlating the first estimate of the echo signal with a sending input signal received on the second input port to generate a correlation signal; and
    computing the first estimate of the echo delay by locating a peak in the correlation signal.

15. The echo canceller of claim 13 further comprising a monitoring circuit configured to detect variation in the echo delay, wherein the delay estimation circuit is further configured to:

compute the first estimate of the echo delay responsive to the detection of variation of the echo delay by the monitoring circuit.

16. The echo canceller of claim 15 wherein the monitoring circuit is configured to detect the variation of the echo delay by:
   computing a performance metric indicative of echo cancellation performance; and
   detecting the variation of the echo delay based on the performance metric.

17. The echo canceller of claim 16 wherein the performance metric computed by the monitoring circuit comprises an echo return loss enhancement.

18. The echo canceller of claim 17 wherein the monitoring circuit is configured to detect the variation of the echo delay based on the performance metric by comparing the echo return loss enhancement to a threshold.

19. The echo canceller of claim 13 wherein the filter circuit is further configured to realign the adaptive filter to compensate for the variation of the echo delay.

20. The echo canceller of claim 13 further comprising a selection circuit wherein:
   the filter circuit further comprises an image filter configured to generate a second estimate of an echo signal from the receiving input signal using a copy of the echo model;
   the delay estimation circuit is configured to compute a second estimate of the echo delay by correlating the estimate of the echo signal with a sending input signal received on said second input port;
   the delay circuit is further configured to delay the second estimate of the echo signal output by the image filter based on the second estimate of the echo delay to time-align the second estimate of the echo signal with the sending input signal; and
   the echo cancellation circuit is further configured to subtract the time-aligned second estimate of the echo signal from the sending input signal to generate a second sending output signal and to select one of the first and second sending output signals for output by the echo canceller.

21. The echo canceller of claim 20 wherein the echo cancellation circuit is configured to select one of the first and second sending output signals by selecting one of the first and second sending output signals with the lowest energy.

22. The echo canceller of claim 21 wherein the echo cancellation circuit is configured to select one of the first and second sending output signals by selecting one of the first and second sending output signals having the highest correlation with the sending input signal.

23. The echo canceller of claim 13 further comprising:
   a monitoring circuit configured to detect packet loss in the echo path; and
   a packet loss concealment circuit configured to, responsive to the detection of the packet loss, modify the first sending output signal to include a loss-concealment packet.

24. The echo canceller of claim 13 further comprising:
   a monitoring circuit configured to detect packet loss in the echo path;
   a packet loss concealment circuit configured to, responsive to the detection of the packet loss, modify the receiving input signal to include a loss-concealment packet; and
   wherein the filter circuit is configured to regenerate the first estimate of the echo signal based on the modified receiving input signal.

25. A non-transitory computer readable medium containing executable program code, that when executed by a processing circuit in an echo canceller for an Internet Protocol (IP) network, causes the processing circuit to:
   generate, from a receiving input signal received over the IP network at first input port of an echo canceller, a first estimate of an echo signal using an adaptive filter that models an echo path between a first output port and a second input port of the echo canceller;
   compute a first estimate of the echo delay by correlating the first estimate of the echo signal with a sending input signal received over the IP network at said second input port
   delay the first estimate of the echo signal output by the adaptive filter based on the first estimate of the echo delay to time-align the echo signal with the sending input signal; and
   subtract the time-aligned first estimate of the echo signal from the sending input signal to generate a sending output signal with reduced echo for output over a second output port of the echo canceller.

\* \* \* \* \*